United States Patent
Ahmadi

(10) Patent No.: US 9,247,542 B2
(45) Date of Patent: Jan. 26, 2016

(54) METHODS AND APPARATUS FOR EFFICIENT SPECTRAL USAGE IN EXTENSIBLE CARRIER DEPLOYMENTS

(71) Applicant: Apple Inc., Cupertino, CA (US)

(72) Inventor: Sassan Ahmadi, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/754,647

(22) Filed: Jan. 30, 2013

(65) Prior Publication Data

US 2013/0195052 A1    Aug. 1, 2013

Related U.S. Application Data

(60) Provisional application No. 61/593,218, filed on Jan. 31, 2012.

(51) Int. Cl.
*H04W 72/04* (2009.01)
*H04W 16/14* (2009.01)
*H04L 5/00* (2006.01)

(52) U.S. Cl.
CPC ........... *H04W 72/0453* (2013.01); *H04L 5/001* (2013.01); *H04L 5/0048* (2013.01); *H04W 16/14* (2013.01); *H04L 5/0032* (2013.01); *H04L 5/0087* (2013.01)

(58) Field of Classification Search
CPC .. H04W 72/0453; H04W 16/14; H04L 5/001; H04L 5/0048; H04L 5/0032; H04L 5/0087
See application file for complete search history.

(56) References Cited

U.S. PATENT DOCUMENTS

| | | | |
|---|---|---|---|
| 2010/0169498 A1 | 7/2010 | Palanki et al. | |
| 2011/0053490 A1* | 3/2011 | Wu | H04W 72/005 455/3.01 |
| 2011/0103243 A1 | 5/2011 | Larsson et al. | |
| 2011/0103308 A1* | 5/2011 | Lee | H04W 48/12 370/328 |
| 2011/0103333 A1* | 5/2011 | Berggren et al. | 370/329 |
| 2011/0149894 A1* | 6/2011 | Luo et al. | 370/329 |
| 2011/0274077 A1* | 11/2011 | Yamada et al. | 370/329 |
| 2012/0198077 A1 | 8/2012 | Wei | |
| 2012/0207079 A1* | 8/2012 | Wang | H04W 28/26 370/315 |
| 2013/0039342 A1* | 2/2013 | Kazmi | H04W 48/16 370/331 |
| 2013/0176952 A1* | 7/2013 | Shin | H04L 5/001 370/329 |

(Continued)

FOREIGN PATENT DOCUMENTS

WO    WO2011050729    5/2011

OTHER PUBLICATIONS

International Search Report from PCT Application No. PCT/US2013/024206, mailed Sep. 12, 2013.

(Continued)

*Primary Examiner* — Ajay Cattungal
(74) *Attorney, Agent, or Firm* — Downey Brand LLP

(57) ABSTRACT

Methods and apparatus for providing efficient spectral usage in extensible carrier deployments. In one embodiment, the deployment comprises a long-term evolution (LTE) or LTE-advanced (LTE-A) network, and a reference carrier resource and one or more3 extensible carrier resources are configured based at least in part on a time and/or frequency separation. In one exemplary implementation, one or more reference carriers are combined with one or more carrier extensions/segments. The resulting aggregated bandwidth can be used to, among other things, optimize overall network operation.

28 Claims, 6 Drawing Sheets

(56) References Cited

U.S. PATENT DOCUMENTS

| | | | | |
|---|---|---|---|---|
| 2013/0215823 | A1* | 8/2013 | Shin | H04L 5/001 370/328 |
| 2013/0242880 | A1* | 9/2013 | Miao | H04L 5/001 370/329 |
| 2013/0329662 | A1* | 12/2013 | Chen | H04W 72/0473 370/329 |
| 2014/0050127 | A1* | 2/2014 | Wang | H04B 7/0486 370/280 |
| 2014/0126523 | A1* | 5/2014 | Gunnarsson et al. | 370/329 |
| 2014/0204893 | A1* | 7/2014 | Horiuchi | H04L 1/1812 370/329 |
| 2014/0226605 | A1* | 8/2014 | Xu | H04W 48/20 370/329 |
| 2014/0241150 | A1* | 8/2014 | Ng | H04W 56/00 370/229 |
| 2014/0314072 | A1* | 10/2014 | Awad | H04W 56/0015 370/350 |

OTHER PUBLICATIONS

"Additional Carrier Type for Rel-11", R1-113186, LG Electronics, 3rd Generation Partnership Project (3GPP) Draft, Oct. 10-14, 2011, Zhuhai, China; chapters 1, 2, 3, 3A; 5 pp.

"Additional carrier types—motivations and issues", R1-112893, Huawei et al., 3rd Generation Partnership Project (3GPP) Draft, Oct. 10-14, 2011, Zhuhai, China; chapters 1, 2.1, 2.2, 2.3; 6 pp.

"Additional carrier types for R11 CA Enhancements", R1-113477, InterDigital Communications et al., 3rd Generation Partnership Project (3GPP) Draft, Oct. 10-14, 2011, Zhuhai, China; chapters 1, 2, 3; 4 pp.

"Additional carrier types for LTE Rel-11", R1-112438, Motorola Mobility, 3rd Generation Partnership Project (3GPP) Draft, Aug. 22-26, 2011, Athens, Greece; p. 1, line 17; p. 2, line 10; 2pp.

"On the Configuration and Usage of New Carrier Types", R1-120271, Apple Inc., 3rd Generation Partnership Project (3GPP) Draft, Feb. 6-10, 2012, Dresden, Germany; chapters 1 and 2, figures 1, 2, 3; pp. 1-6.

Taiwanese Patent Application No. 102103820—Office Action dated Aug. 22, 2014.

"Additional Carrier Types for LTE Rel-11", R1-113260, Motorola Mobility, 3GPP TSG RAN WG1 Meeting #66bis, Oct. 10-15, 2011, Zhuhai, China.

"Discussion on design principles for additional carrier types", R1-112925, Ericsson, ST-Erricson, 3GPP TSG RAN WG1 Meeting #66bis, Oct. 10-14, 2011, Zhuhai, China.

"Further discussion on information provided to target", R2-104665, NEC, 3GPP TSG RAN2 Meeting #71, Aug. 23-27, 2010, Madrid, Spain.

"On the Structure and Usage Scenarios of ePDCCH", R1-114300, Apple Inc., 3GPP TSG RAN WG1 Meeting #67, Nov. 14-18, 2011, San Francisco, USA.

"Views on Extension carrier and Carrier segments", R1-112129, NEC Group, 3GPP TSG RAN WG1#66, Aug. 22-26, 2011, Athens, Greece.

"Design Considerations for Extension Carriers and Carrier Segments", R1-100408, Alcatel-Lucent, Alcatel-Lucent Shanghai Bell, 3GPP TSG-RAN WG1 Meeting #59bis, Jan. 18-22, 2010, Valencia, Spain.

"Views on additional carrier types for CA in Rel-11", R1-112281, Pantech, 3GPP TSG RAN1 #66, Aug. 22-26, 2011, Athens, Greece.

"Framework to define additional carrier type: Carrier segments", R1-113227, NEC Group, 3GPP TSG RAN WG1 Meeting #66bis, Oct. 10-14, 2011, Zhuhai, China.

Japanese Patent Application No. 2014-555716—Office Action dated Jul. 27, 2015.

Ericsson, ST-Ericsson,"Further details on design principles for additional carrier types," R1-113675, 3GPP TSG RAN WG1 Meeting #67, San Francisco, CA (Nov. 14-18, 2011).

Korean Patent Application No. 10-2014-7024287—Office Action dated Sep. 10, 2015.

* cited by examiner

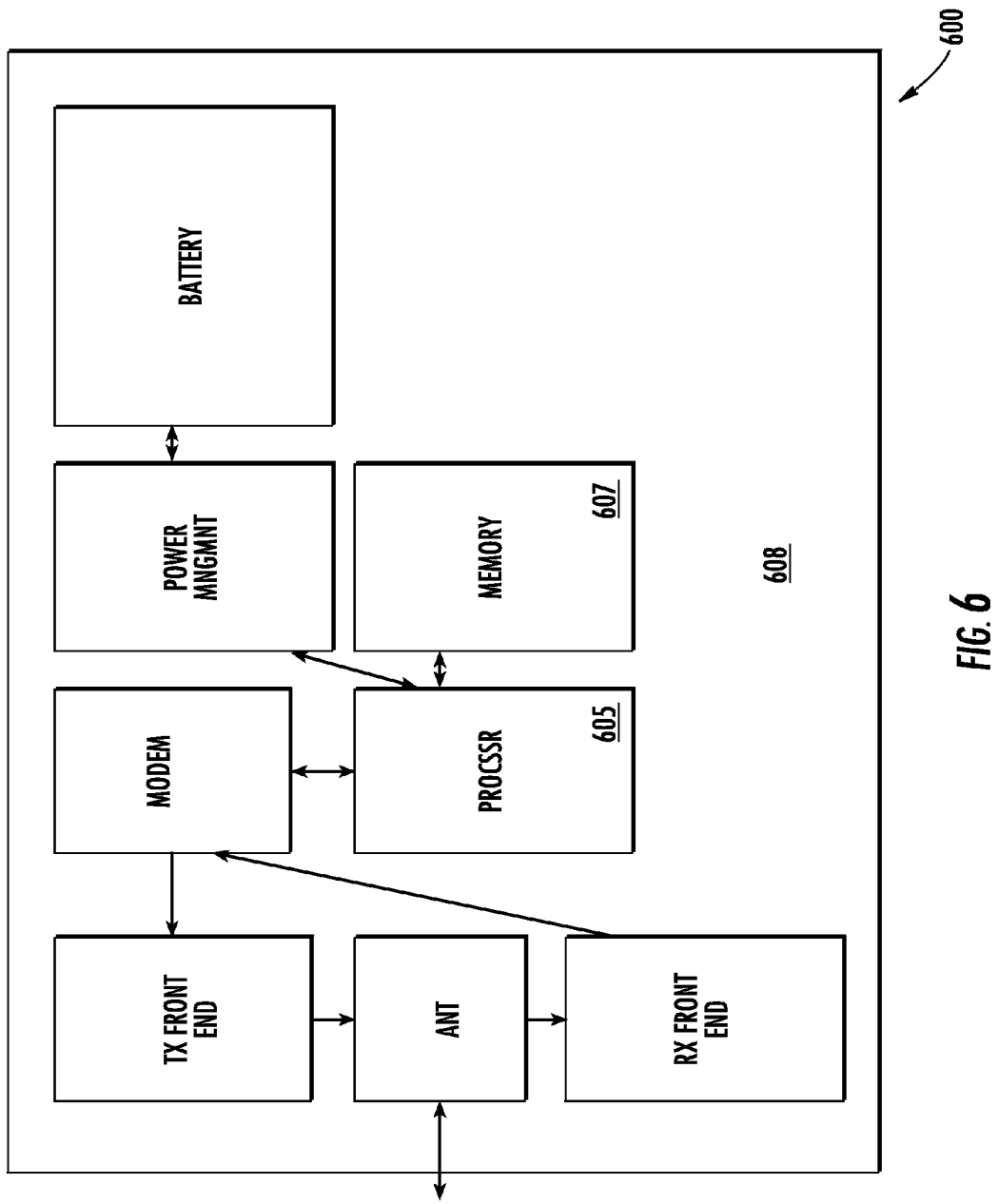

METHODS AND APPARATUS FOR EFFICIENT SPECTRAL USAGE IN EXTENSIBLE CARRIER DEPLOYMENTS

PRIORITY AND RELATED APPLICATIONS

This application claims priority to U.S. Provisional Patent Application Ser. No. 61/593,218 filed Jan. 31, 2012 and entitled "METHODS AND APPARATUS FOR EFFICIENT SPECTRAL USAGE IN EXTENSIBLE CARRIER DEPLOYMENTS", the foregoing being incorporated herein by reference in its entirety.

This application is also related to co-owned, co-pending U.S. patent application Ser. No. 13/754,673 filed contemporaneously herewith on Jan. 30, 2013, and entitled "METHODS AND APPARATUS FOR ENHANCED SCRAMBLING SEQUENCES", which claims priority to U.S. Provisional Application Ser. No. 61/593,208 filed on Jan. 31, 2012, and entitled "METHODS AND APPARATUS FOR ENHANCED SCRAMBLING SEQUENCES", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of wireless networks and telecommunications. More particularly, in one exemplary embodiment, the present disclosure describes configuration and usage of extensible carrier resources within a wireless (e.g., cellular) network.

2. Description of Related Technology

Incipient research in spectral usage and deployment address an ever increasing demand for higher capacity and higher data rates in cellular networks. Significant areas of interest include modifications to existing data and control information transmission structures (also referred to throughout as "carriers"). For example, standardization efforts for 3GPP (3rd Generation Partnership Project) Long Term Evolution (LTE) Release 11 have been directed to partially-configured carrier structures within non-backward compatible configurations.

Within the context of 3GPP LTE Release 11, proposed and/or existing solutions for carrier design are required to support operation in the following scenarios: (i) synchronized carriers (i.e., where the legacy and segment/extension carriers are synchronized in time and frequency), and (ii) unsynchronized carriers (i.e., where the legacy and segment/extension carriers are not synchronized in time and/or frequency such that separate synchronization processing is required in the receiver). More directly, carrier synchronization has a direct impact on the processing burden of the receiver.

Generally, network operators struggle with adding new spectrum within coverage areas which have existing spectral deployments. While synchronized carriers are preferred to reduce overall receiver complexity, unsynchronized carriers are easier to deploy. Existing solutions for improving network coverage rely on adding more spectrum; however, incipient research is directed to more efficient spectral usage and/or additional optimizations which may be possible, with larger aggregated bandwidths.

Hence, improved solutions are needed for configuration and usage of extensible carrier resources within a wireless (e.g., cellular) networks. Ideally, such solutions for carrier deployment should optimize energy efficiency, provide flexible spectrum usage, enable heterogeneous network deployments, and/or enable machine type communications.

SUMMARY

The present disclosure satisfies the aforementioned needs by providing, inter alia, improved apparatus and methods for providing efficient spectral usage in extensible carrier deployments.

Firstly, a method for providing efficient spectral usage in extensible carrier deployments is disclosed. In one embodiment, the method includes: identifying one or more reference carriers and one or more carrier extensions/segments; aggregating the identified one or more reference carriers and one or more carrier extensions/segments; and provisioning the aggregated one or more reference carriers and one or more carrier extensions/segments.

In a second embodiment, the method includes: identifying one or more reference carriers and one or more carrier extensions or segments; aggregating the identified one or more reference carriers and the one or more carrier extensions or segments into an aggregated band; and provisioning the aggregated band.

A base station device for providing efficient spectral usage in extensible carrier deployments is also disclosed. In one embodiment, the base station is capable of operation within a cellular (e.g., LTE) network, and includes logic configured to aggregate one or more reference carriers and one or more carrier extensions/segments.

A computer readable apparatus is further disclosed. In one embodiment, the apparatus includes a storage medium having at least one computer program disposed thereon, the at least one program being configured to, when executed, provide efficient spectral usage in extensible carrier deployments.

An integrated circuit (IC) is also disclosed. In one embodiment, the integrated circuit includes logic which is configured to provide efficient spectral usage in extensible carrier deployments.

A wireless system is further disclosed. In one embodiment, the system includes a plurality of base stations and a plurality of mobile user devices. The base station devices are configured to provide efficient spectral usage in extensible carrier deployments.

A method of operating a mobile device is additionally disclosed. In one embodiment, the method includes evaluating a carrier received by the mobile device, and selectively adjusting one or more reception modes accordingly.

A method for providing efficient spectral usage in extensible carrier deployments is disclosed. In one embodiment, the method includes: identifying one or more reference carriers and one or more carrier extensions or segments; aggregating the identified one or more reference carriers and the one or more carrier extensions or segments into an aggregated band; and provisioning the aggregated band.

In some variants, the identification is performed at least by a network of base stations in a peer-to-peer manner.

In other variants, the identification is performed at least by a centralized network authority.

In still other variants, the one or more reference carriers comprises at least one fully configured backward compatible reference carrier; and the one or more carrier extensions or segments comprises only a subset of reference carrier functionality. In certain instances, the one or more carrier extensions or segments are configured without reference signals specific to one or more cells. Moreover, in certain cases, the one or more carrier extensions or segments are further configured to support enhanced control signaling based on at least one self-contained reference signal.

In still other variants, the one or more carrier extensions or segments are configured with Primary Synchronization Symbols (PSS) or Secondary Synchronization Symbols (SSS); and the PSS and SSS indicate a time reference associated with the one or more carrier extensions or segments.

In certain variants, the one or more carrier extensions or segments are configured with demodulation reference signals and channel state information reference signals. For instance, the channel state information reference signals enables user equipment to perform channel estimation and coherent detection of at least one control or data channel.

In some implementations, at least one or more guard band resource blocks between the frequency bands associated with the reference resources and the one or more extensible resources are re-allocated for data traffic.

Mobile apparatus configured to implement efficient spectral usage in a network is disclosed. In one embodiment, the mobile apparatus includes: a receiver; a processor in signal communication with the receiver; and logic in communication with the processor. In one exemplary embodiment, the logic is configured to: identify one or more reference carriers and one or more carrier extensions; determine whether the one or more reference carriers is contiguous with the one or more carrier extensions in the frequency domain; and select one or more reception modes based at least in part on the determination.

In some variants, the logic is further configured to receive, when determination indicates that the one or more reference carriers is not contiguous with the one or more carrier extensions, one or more synchronization signals associated with the one or more carrier extensions. In one such example, the one or more carrier extensions contains one or more user equipment specific reference signals.

In other variants, the logic is further configured to receive, when the one or more reference carriers is determined to be contiguous with the one or more carrier extensions, synchronization signals associated with the one or more reference carriers.

Still other implementations may be further configured to receive, when the one or more reference carriers is contiguous with the one or more carrier extensions, guard band resource blocks at the periphery of the bandwidth comprising the one or more reference carriers and the one or more carrier extensions.

A base station apparatus for use in a long term evolution (LTE)-enabled cellular wireless communications network is disclosed. In one embodiment, the base station apparatus includes: a wireless interface, the wireless interface configured to communicate with a plurality of wireless devices; a processor; and a computer readable apparatus having a storage medium with at least one computer program stored thereon. In one exemplary embodiment, the at least one computer program is configured to, when executed on the processor, cause the base station apparatus to: identify one or more reference carriers provided by at least one other base station apparatus; generate at least one or more carrier extensions; and aggregate the one or more reference carriers and the at least one or more carrier extensions.

A wireless system is disclosed. In one embodiment, the wireless system includes a plurality of base stations configured to provide cellular network service to a plurality of mobile user devices, where at least a first set of base station devices are configured to provide at least one or more reference carriers, and where a second set of base station devices are configured to provide at least one or more carrier extensions, and where the first and second set of base station devices are different.

In some variants, the at least one or more carrier extensions and the at least one or more reference carriers, when aggregated, form a contiguous bandwidth. In certain cases, the at least one or more carrier extensions and the at least one or more reference carriers, when aggregated, form a non-contiguous bandwidth.

A method of operating a mobile device within a wireless system is disclosed. In one exemplary embodiment, the method includes: evaluating one or more reference carriers and one or more carrier extensions; based at least in part on the evaluation, aggregating the one or more reference carriers and one or more carrier extensions; and receiving the aggregated one or more reference carriers and one or more carrier extensions with a single Fast Fourier Transform (FFT) element.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 6 illustrates an exemplary embodiment of a base station apparatus in accordance with the principles described herein.

Figure 1:
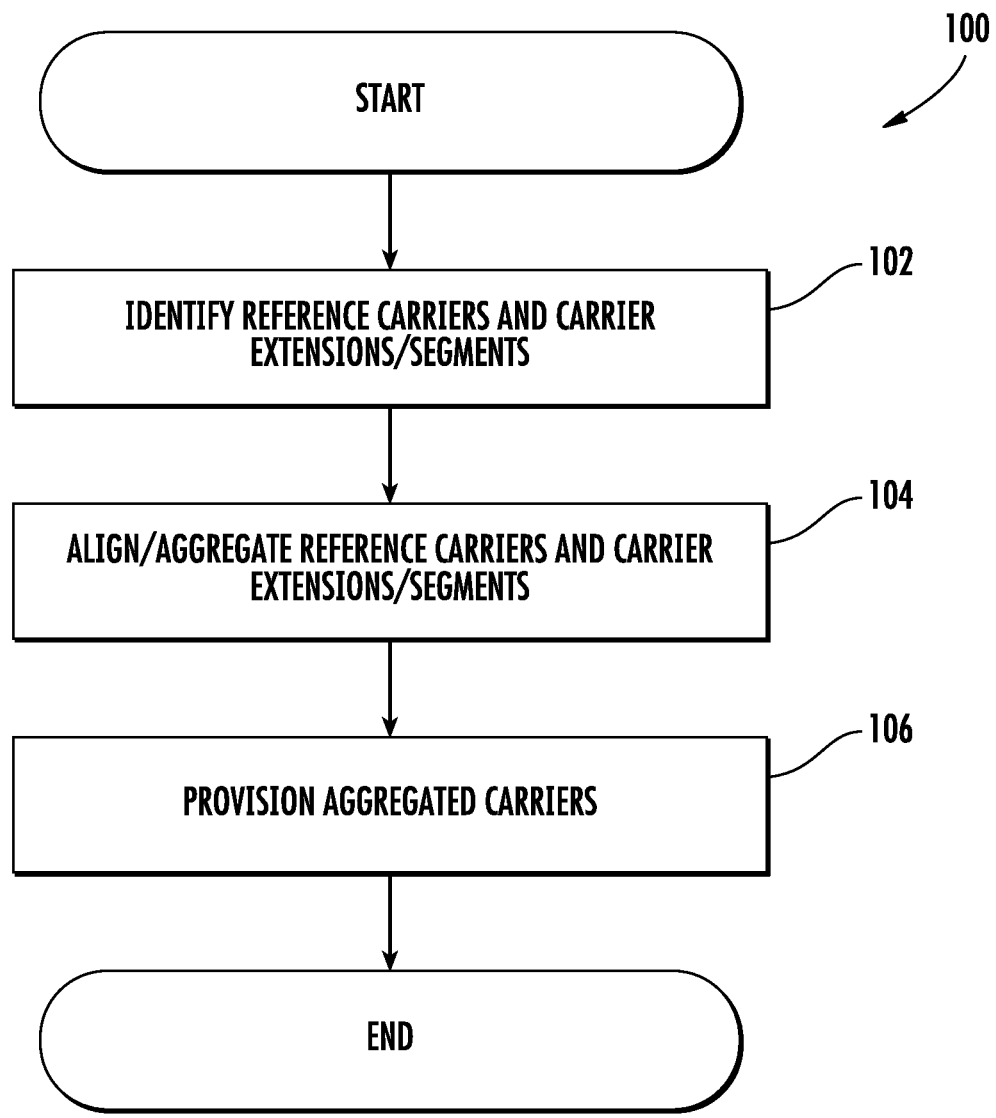
FIG. 1 is a logical flow diagram depicting one embodiment of a generalized method for providing efficient spectral usage in extensible carrier deployments, in accordance with the present disclosure.

All FIGS. ©Copyright 2013 Apple Inc. All rights reserved.

DETAILED DESCRIPTION

Reference is now made to the drawings, wherein like numerals refer to like parts throughout.

Overview

In one exemplary embodiment, a reference carrier resource and one or more extensible carrier resources are configured based at least in part on a time and/or frequency separation. Within the context of exemplary embodiments described herein, the reference carrier resources and/or one or more extensible carrier resources are aligned and aggregated for use.

In one exemplary implementation, the one or more extensible carrier resources are further configured without Cell-specific Reference Signals (CRS). As described in greater detail hereinafter, CRS equivalent functionality can be determined from alternate data and control channel signaling. For example, certain properties of CRS can be replaced with equivalent properties of e.g., the Demodulation Reference Signals (DM-RS) and Channel State Information Reference Signals (CSI-RS).

In one such variant, one or more extensible carrier resources may be used in combination with a reference carrier. For deployments where there is insufficient time/frequency synchronization between the reference carrier resource and the one or more extensible carrier resources, the Primary Synchronization Symbols (PSS) and/or Secondary Synchronization Symbols (SSS) are additionally configured on the one or more extensible carrier resources.

As previously alluded to, the Demodulation Reference Signals (DM-RS) and Channel State Information Reference Signals (CSI-RS) may be configured on the one or more extensible carrier resources to provide functional equivalence to legacy CRS signaling. For example, rather than performing mobility measurements and carrier activation/deactivation measurements on CRS, such measurements can be performed based on an appropriately configured DM-RS and/or CSI-RS.

The CSI-RS is configured to mitigate interference with data/control transmissions in the same cell; however, the CSI-RS may interfere with carrier resources (reference or extensible resources) of neighboring cells. Accordingly, certain interference management techniques described herein are used as necessary to reduce inter-cell CSI-RS interference (e.g., muting, non-overlapping assignments, etc.).

Finally, in yet another variant, the guard band resource blocks between the reference resources and the one or more extensible resources may be re-allocated for data traffic. Reallocation of guard band resource blocks for data traffic significantly increases spectral utilization efficiency.

Configuration and Usage of Carrier Resources—

As previously stated, within the context of 3GPP LTE Release 11, proposed and/or existing solutions for carrier design are required to support both synchronized and unsynchronized carrier deployments. Accordingly, in one exemplary use scenario, the network is configured for operation without Cell specific Reference Signals (CRS-free). In some circumstances, the network may further support enhanced control signaling with self-contained reference signals and dynamic configurability of synchronization and other reference signal types.

As described in greater detail herein, carrier types are disclosed for both extension carriers and carrier segments. As used herein, the term "reference carrier" refers to a fully-configured backward compatible carrier. As used herein, the term "extension carrier" refers to a carrier which cannot be operated as a single stand-alone carrier; rather, extension carriers must be part of a component carrier set that includes at least one fully-configured carrier. Similarly, as used herein, the term "carrier segments" refers to additional bandwidth extensions for a compatible carrier. Carrier segments provide a mechanism to utilize frequency resources in deployment cases where new transmission bandwidths are needed in a backward compatible manner complementing carrier aggregation schemes.

Within the context of the present disclosure, various schemes are disclosed for reducing the additional Physical Downlink Control Channel (PDCCH) transmission overhead that would be required for legacy PDCCH schemes while also enabling small transport block sizes within the carrier segments. Carrier segments enable aggregation of additional resource blocks within a component carrier, while still retaining backward compatibility over the original carrier bandwidth. Carrier segments can be adjacent to, and/or linked to a fully-configured carrier. In one such embodiment, carrier segments do not include synchronization signals, system information or paging information.

As a brief aside, CRS-free operation provides multiple benefits for network operation. Firstly, CRS-free carrier types reduce overall interference attributed to the CRS transmissions (both inter-cell and intra-cell interference). Moreover, resources that would otherwise be reserved for CRS operation can be allocated to e.g., data or control traffic. Finally, CRS-free carrier types can reduce overall power consumption (CRS transmissions are always on, even when the cell is not fully loaded).

Unfortunately, CRS-free operation has certain deficiencies which must be addressed. Specifically, CRS traditionally handles multiple important functions including without limitation: channel estimation, mobility measurements, and time/frequency tracking. Accordingly, alternative solutions for the foregoing functions are required for CRS-free operation.

One embodiment addresses these deficiencies using, inter alia, data transmission and enhanced control signaling based on self-contained reference signals (RS). Rather than prior art solutions which rely on a CRS, a self-contained RS can be used for channel estimation. For example, in one such embodiment, transmission modes are based on the Demodulation Reference Signal (DM-RS). Other variations may include for example, device-specific RS.

Moreover, CRS-free carriers should provide configurable signaling structures e.g., Primary Synchronization Signaling (PSS), Secondary Synchronization Signaling, etc.). Such configurability may be necessary based on the deployment signals, etc. For example, transmissions of PSS/SSS can provide time and/or frequency synchronization capabilities; thus, systems which are closely synchronized may reduce or eliminate PSS/SSS transmissions altogether.

Various configurations of reference carriers, extension carriers and carrier segments are further described herein. Specifically, various embodiments are described with respect to conditions and/or use scenarios (e.g., based on relative spectral locations, time and/or frequency alignment, etc.).

Methods—

FIG. 1 illustrates one embodiment of a generalized method 100 for providing efficient spectral usage in extensible carrier deployments, in accordance with the various principles described herein.

At step 102 of the method 100, one or more reference carriers and one or more carrier extensions/segments are identified. In one approach, carrier identification is performed in a peer-to-peer manner by the base station devices. In other embodiments, carrier identification is performed by a centralized network authority. For example, within 3GPP networks, peer-to-peer communication among LTE eNBs is performed via an X2 interface, communication between NodeBs (and between NodeBs and eNBs) is handled via the Core Network. In other network configurations (e.g., heterogeneous networks, etc.), communication between base stations may require routing via the Core Network.

In one configuration, a network of base stations provides at least one fully configured backward compatible reference carrier, and one or more carrier extensions/segments which provide only a subset of reference carrier functionality. In one such example, the one or more carrier extensions/segments lack one or more Cell-specific Reference Signals (CRS). The one or more carrier extensions/segments only provide Demodulation Reference Signals (DM-RS). Unlike CRS, DM-RS are specific to one or more serviced user equipment (UE) devices.

At step 104 of the method 100, the identified one or more reference carriers and one or more carrier extensions/segments are aligned and/or aggregated. Generally, the process of alignment includes shifting the one or more carrier extensions/segments in time and/or frequency. In one exemplary embodiment, the one or more reference carriers and one or more carrier extensions/segments are combined into an aggregated bandwidth. In other embodiments, only select ones of the one or more reference carriers and one or more carrier extensions/segments are aligned and/or aggregated.

Common reasons for alignment and aggregation may include, without limitation: network usage, network optimization, spectral efficiency, reduced processing burden on the population of client devices, etc. For example, in one implementation, a reference carrier that is within close proximity to available bandwidth can incorporate one or more carrier extensions/segments, thereby improving overall network bandwidth.

In another variant, the aggregated bandwidth is further organized in a manner to improve overall reception. For example, in one such embodiment, one or more portions of the aggregated bandwidth are allocated or de-allocated for Cell-specific Reference Signals (CRS). Removing CRS resources can provide multiple benefits for network operation. Firstly, CRS-free carrier types reduce overall interference attributed to the CRS transmissions (both inter-cell and intra-cell interference).

Moreover, resources that would otherwise be reserved for CRS operation can be allocated to e.g., data or control traffic. Finally, CRS-free carrier types can reduce overall power consumption (CRS transmissions are always on, even when the cell is not fully loaded). However, a certain portion of CRS resources are minimally required to assist in calculations such as channel estimation, mobility measurements, and time/frequency tracking.

In some circumstances, CRS resources are replaced with equivalent functionality offered by alternate data and control channel signaling. For example, certain properties of CRS can be replaced with equivalent properties of the Demodulation Reference Signals (DM-RS). DM-RS are specific to the client device, and thus can be optimized based on client device performance. For instance, a device that has very high reception quality can operate with fewer DM-RS resources. Similarly, during periods of relatively low usage, fewer resources can be directed to DM-RS operation.

In other scenarios, one or more portions of the aggregated bandwidth are organized into guard bands (i.e., guard bands do not carry traffic, and merely serve to reduce the effects of interference). By carefully positioning guard bands at the edges of the aggregated bandwidth, receiver complexity and processing burden can be significantly reduced. For instance, providing a contiguous extent of bandwidth (as opposed to a non-contiguous bandwidth) greatly simplifies transceiver operation (only a single receiver filter, etc.) and processing (only a single Fast Fourier Transform (FFT)). Unfortunately, guard band placement requires fine timing and frequency synchronization which may not always be possible; thus, the benefits of guard band organization may in certain cases need to be balanced with the overall cost or feasibility of synchronization.

In another such embodiment, one or more portions of the aggregated bandwidth are allocated for Primary Synchronization Symbols (PSS) and Secondary Synchronization Symbols (SSS). PSS and SSS assist in timing by providing a time reference, but are otherwise unused for data and control traffic. Thus, PSS and SSS can be reduced for systems which are well synchronized; however it is appreciated that where synchronization is poor, overall performance improvement may require significantly more resources allocated for PSS and SSS signaling.

At step 106 of the method 100, the one or more reference carriers and one or more carrier extensions/segments are provisioned in accordance with the carrier alignment/aggregation.

Example Operation—

As a brief aside, existing proposals for new carrier types in wireless standards such as 3GPP LTE Release 11 do not have to be backward compatible with legacy carriers. For example, legacy constructs such as the Physical Downlink Control Channel (PDCCH), Cell-specific Reference Signals (CRS), Physical Broadcast Channel (PBCH), Primary Synchronization Signals (PSS), Secondary Synchronization Signals (SSS), etc. may be allocated differently, scheduled differently, and/or removed altogether. Unfortunately, without further enhancements in the downlink control channels, such modifications must rely on cross carrier scheduling from a legacy carrier (i.e., a legacy carrier must be used to indicate the idiosyncrasies of the non-backward compatible carriers). This cross carrier scheduling is undesirable for multiple reasons which will be evident to those of ordinary skill in the wireless arts.

In contrast, various solutions provided by the present disclosure provide significant improvements over existing proposals, in that a carrier extension/segment can append additional resource blocks to a component carrier while still advantageously retaining the backward compatibility of the primary carrier. The disclosed carrier extensions/segments are useful in practical deployments, such as where the size of the available frequency block does not match the provisioned bandwidths of 1.4, 3, 5, 10, 15 and 20 MHz. In practical deployment scenarios, the frequency gap between the reference carrier and the carrier extension/segment may be excessively large. In such deployments, the carrier extension/segment may additionally require frequency synchronization and slot/subframe alignment (time), which must be handled with additional control signaling overhead.

In one embodiment, the carrier extensions/segments can be added without CRS (which are wideband common reference signals), and instead provide CRS functionality via UE-specific reference signals (which are narrowband and dedicated reference signals). During operation, the UE-reference signals (e.g. a Demodulation Reference Signal (DM-RS), Channel State Information Reference Signals (CSI-RS), etc.) is used for channel estimation and coherent detection of control and data channels. In some embodiments, the CRS (or a similar wideband synchronization signal), or an abbreviated version thereof, may be required on the carrier extension/segment for path loss (and/or Reference Signal Received Power (RSRP), Reference Signal Received Quality (RSRQ)) measurements that can be used for mobility management, triggering handover, and activation and deactivation of carrier operation.

The reference carrier and the one or more carrier extension/segment may be aligned in time, based on e.g., symbols, slots, subframes, etc. For Orthogonal Frequency Division Multiple Access (OFDMA) operation, the timing error can be resolved by the cyclic prefix; i.e., the longer the cyclic prefix, the more the timing error that can be tolerated. However, generally, the cyclic prefix length is a constraint of the system, thus, within the context of 3GPP LTE, the timing synchronization between the reference carrier and the one or more carrier extensions/segments may not exceed the capabilities of the cyclic prefix. More directly, the mobile device can use the cyclic prefix to logically advance or retard the carrier extensions/segments to a common time base. While each carrier extension/segment may have a different number of cyclic prefix (and suffix) bits, by removing the cyclic prefix bits, each carrier is effectively time shifted back to a common time base. For example, a carrier extension/segment which has arrived later in time will have more cyclic prefix bits than the other carrier extensions/segments; by removing the extra cyclic prefix bits the later arriving carrier extension/segment is time aligned to the other carrier extensions/segments.

Time alignment simplifies certain operations; for example, Hybrid Automatic Repeat Request (HARQ) timing and operation, as well as resource assignments for the reference carrier and the carrier extensions/segments. In particular, by ensuring that both the reference carrier and the carrier extensions/segments are synchronized, the aggregated bandwidth can be treated as having a common time base. A common time base is necessary to perform a Fourier Transform; thus, a single FFT element can be used to process a synchronized reference carrier and its associated one or more carrier extensions/segments (i.e., rather than requiring distinct FFT for each distinct time base).

Similarly, frequency alignment greatly simplifies transceiver operation. Since a Fourier Transform requires regular subcarrier spacing, maintaining similar subcarrier spacing ensures that a single FFT can be performed. In one such embodiment, the frequency separation between the frequency-contiguous reference carrier and the carrier segment/extension is configured for an integer multiple of 300 kHz, consistent with existing LTE specifications. Similarly, the center frequencies are integer multiples of the LTE channel raster (i.e., 100 kHz). It is further appreciated that the foregoing spacing widths are chosen merely to conform to the LTE specification; other wireless technology standards with which the disclosed embodiments are useful may have different spacing widths.

Moreover, for deployments which are not at appropriate frequencies, then frequency offsets can be specified to align the center frequencies. In one such embodiment, the offsets can be predefined and signaled via RRC messages. By providing a scheme for synchronizing timing and frequency synchronization among non-continuous carriers, the provisioning and use of PSS and SSS on the carrier extensions/segments can be greatly reduced.

Depending on the relative location of the reference carriers and the one or more carrier extensions/segments in the frequency domain, at least three distinct configuration/usage scenarios are described: (i) where the reference carrier and the one or more carrier extensions/segments are not contiguous in the frequency domain, (ii) where the reference carrier and the one or more carrier extensions/segments are contiguous in the frequency domain, (iii) and where the reference carrier and the one or more carrier extensions/segments are contiguous in the frequency domain and guard band operation can be modified.

In the following discussions, the carriers (reference and extensions/segments) are sufficiently synchronized in the time and frequency domains regardless of the relative location of the frequency bands. Moreover, while the enclosed figures provide example configurations for two carrier extensions/segments, the proposed scheme can be extended to an arbitrary number of carrier extensions/segments. Furthermore, within the context of LTE systems, the aggregated number of resource blocks (e.g., reference carriers, the carrier extensions/segments, and optional guard bands) must be less than 110. This limitation is due to existing LTE limitations, which would not apply for other wireless technologies, and conceivably future incarnations of LTE.

Finally, as described herein, the carrier extensions/segments do not maintain a Cell-specific Reference Signal. Rather, the carrier extensions/segments exclusively use Demodulation Reference Signals (DM-RS) for channel estimation and coherent detection of the control and data channels. In one such variant, the carrier extensions/segments are further configured to use a Physical Downlink Control Channel (PDCCH).

Figure 2:
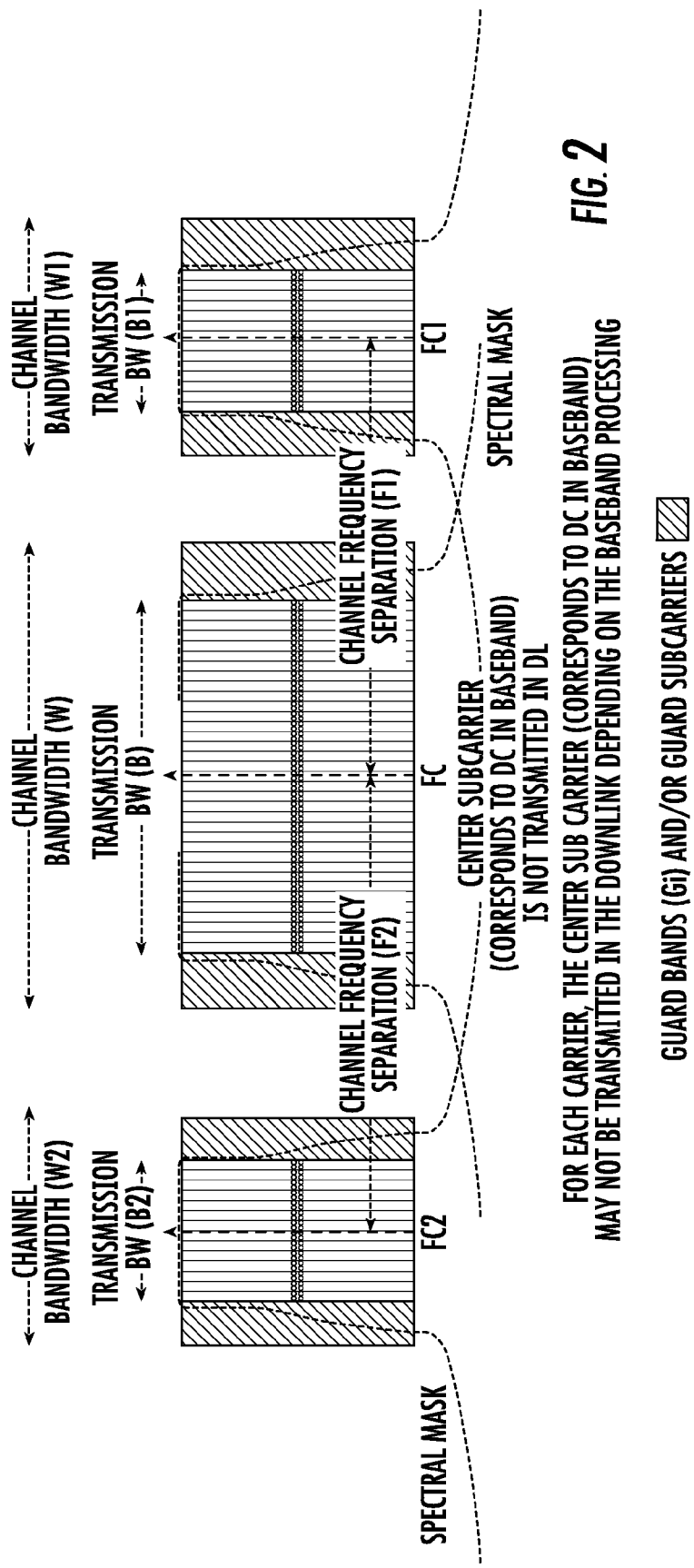
FIG. 2 is a graphical representation of a first exemplary scenario where a reference carrier and one or more carrier extensions/segments are not contiguous in the frequency domain, the foregoing illustrative of various principles of the present disclosure.

Referring now to FIG. 2, a first exemplary scenario is illustrated, wherein the reference carrier and the one or more carrier extensions/segments are not contiguous in the frequency domain. As shown, if the channel separation is excessively large, then each carrier must include time/frequency synchronization signals (PSS/SSS), and the guard bands cannot be used for control/data transmission. Furthermore each carrier extension/segment must contain UE-specific reference signals (DM-RS, and CSI-RS). The CSI-RS can be used for channel state information (CSI) measurements and path loss measurements that can be useful in triggering activation/deactivation of the carrier extensions/segments.

Figure 3:
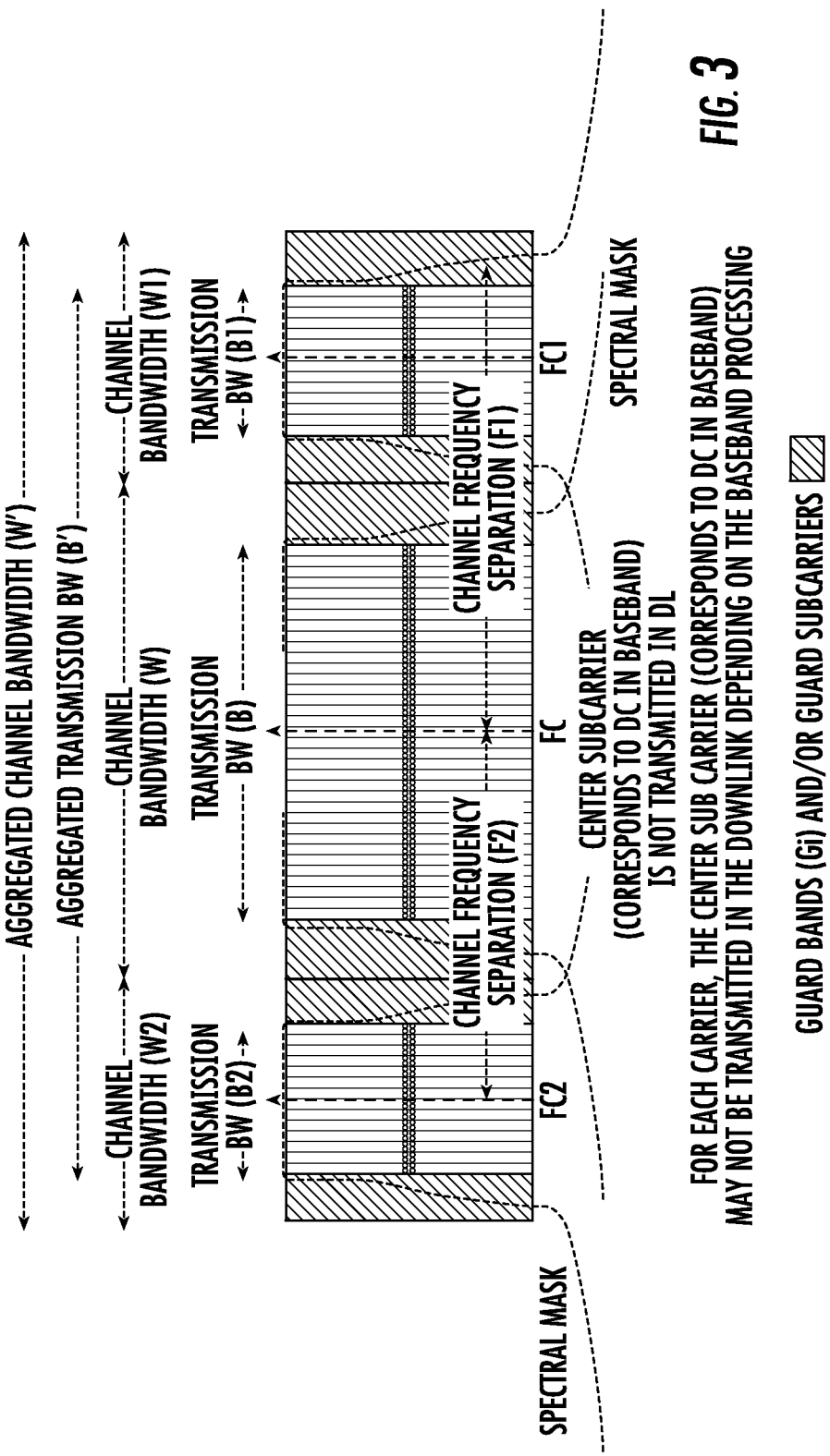
FIG. 3 is a graphical representation of a second exemplary scenario where a reference carrier and one or more carrier extensions/segments are contiguous in the frequency domain, the foregoing illustrative of various principles of the present disclosure.

FIG. 3 illustrates a second exemplary scenario, wherein the reference carrier and the one or more carrier extensions/segments are contiguous. As shown, the channel separation is not excessively large to the extent that additional time/frequency synchronization is required for the new carrier types. Consequently, the one or more carrier segments/extensions do not require a distinct PSS/SSS. In this scenario, the UE-specific reference signals and CSI-RS are configured on the carrier extensions/segments, however the guard band resource blocks are still dispersed throughout the bandwidth. FIG. 3 notably does not have any backward compatibility implications, as the spectral filtering and emission masking are performed consistent with legacy compatibility (e.g., LTE)

Figure 4:
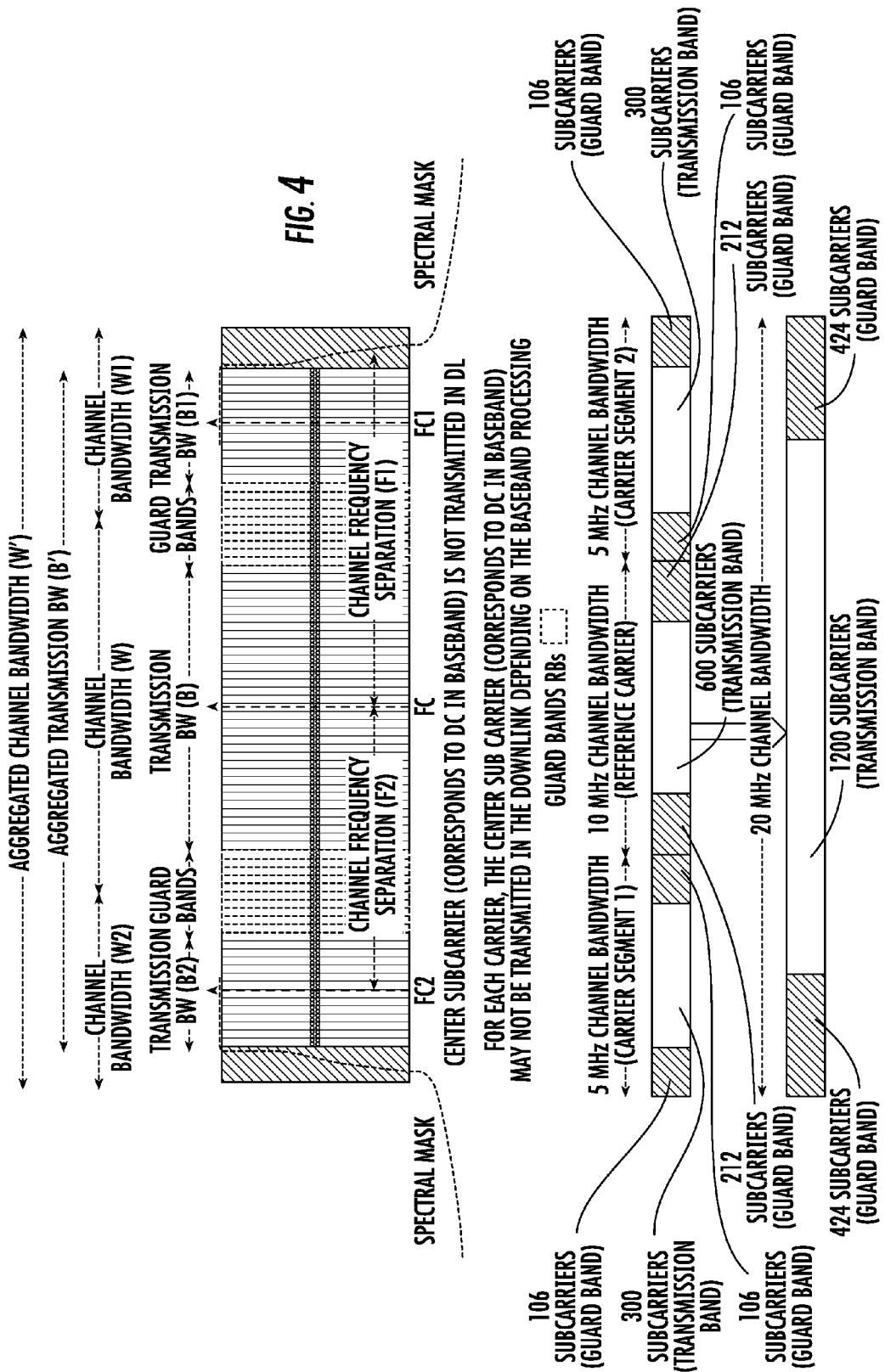
FIG. 4 is a graphical representation of a third exemplary scenario where the reference carrier and the one or more carrier extensions/segments are contiguous in the frequency domain and where backward compatibility is not required, the foregoing illustrative of various principles of the present disclosure.

Referring now to FIG. 4, where the backward compatibility is not required, aggregated bandwidth can be further organized so as to move the guard band resource blocks to the periphery of the bandwidth. As shown in FIG. 4, the spectral filtering and the emission masking at the edges of the carriers are increased proportionate to the size of the aggregated transmission bandwidth. This proportionate increase in guard band size ensures that legacy UEs can still operate without interruption. In alternate variants, the guard band size can be decreased, if the legacy UEs are limited only to a subset of the frequencies (i.e., legacy UEs are only scheduled within the center of the aggregated bandwidth). In FIG. 4 (as in FIG. 3), the one or more carrier extensions/segments do not require a PSS/SSS and rely exclusively on UE-specific reference signals and CSI-RS for e.g., channel estimation, etc. The UE-specific reference signals and CSI-RS may be further extended over the guard bands and the one or more carrier extensions/segments. The aggregated total bandwidth can be operated as a virtualized wideband carrier.

More generally, for the scenario where two carrier segments are deployed with 5 MHz of bandwidth, next to a reference carrier having a 10 MHz bandwidth. The aggregated carrier can be configured as a 20 MHz carrier by appending the carrier segments on the left and the right side of the reference band. Moreover, by removing the legacy guard bands, and increasing the size of the left and right guard bands, the aggregated carrier can comply with 20 MHz legacy carriers.

It will also be readily recognized by ones of ordinary skill in the related arts (when given the present disclosure) that other configurations of the guard bands and the transmission bands are also possible, as long as the resulting combination remains consistent with desired RF and spectral emissions behavior (legacy or otherwise).

Exemplary User Equipment (UE) Apparatus—

Figure 5:
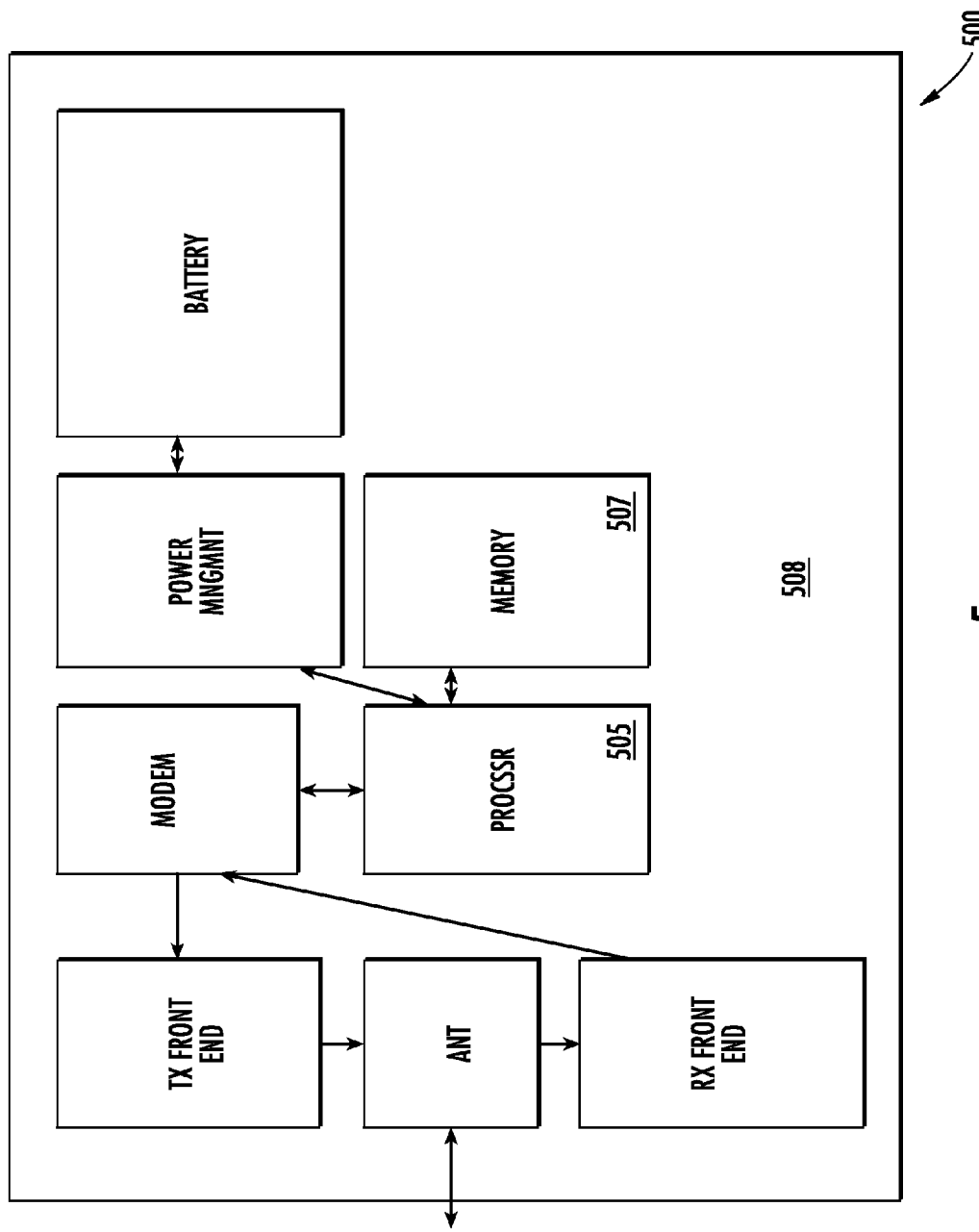
FIG. 5 illustrates an exemplary embodiment of a user or client apparatus in accordance with the principles described herein.

Referring now to FIG. 5, exemplary client or UE apparatus 500 useful in implementing the methods of the present disclosure is illustrated. As used herein, the terms "client" and "UE" include, but are not limited to cellular telephones, smartphones (such as for example an iPhone™), wireless enabled personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), or any combinations of the foregoing. The configuration and usage of extensible carrier resources is preferably performed in software, although firmware and/or hardware embodiments are also envisioned; this apparatus is described subsequently herein with respect to FIG. 5.

The UE apparatus 500 includes a radio modem or transceiver, a processor subsystem 505 such as a digital signal processor, microprocessor, field-programmable gate array, or plurality of processing components mounted on one or more substrates 508. The processing subsystem may also include an internal cache memory. The processing subsystem 505 is connected to a memory subsystem 507 including memory which may for example, include SRAM, flash and SDRAM components. The memory subsystem may implement one or a more of DMA type hardware, so as to facilitate data accesses as is well known in the art. In the illustrated embodiment, the processing subsystem additionally includes subsystems or modules for determining the appropriate reference carrier and one or more carrier extensions/segments, and configuring operation thereto. These subsystems may be implemented in software or hardware which is coupled to the processing subsystem. Alternatively, in another variant, the subsystems may be directly coupled to the digital baseband.

Exemplary Base Station (BS) Apparatus—

Referring now to FIG. 6, exemplary server or base station (BS) apparatus 600 useful in implementing the methods of the present disclosure is illustrated. As used herein, the terms "server" and "BS" include, but are not limited to base stations (e.g., NodeB, eNodeB, etc.), access points, relay stations, etc. The configuration of one or more reference carriers and/or one or more carrier extensions/segments is preferably performed in software, although firmware and/or hardware embodiments are also envisioned; this apparatus is described subsequently herein with respect to FIG. 6.

The BS apparatus 600 includes a wireless modem or transceiver, a processor subsystem 605 such as a digital signal processor, microprocessor, field-programmable gate array, or plurality of processing components mounted on one or more substrates 608. The processing subsystem may also include an internal cache memory. The processing subsystem 605 is connected to a memory subsystem 607 including memory which may for example, include SRAM, flash and SDRAM components. The memory subsystem may implement one or a more of DMA type hardware, so as to facilitate data accesses as is well known in the art. In the illustrated embodiment, the processing subsystem additionally includes subsystems or modules for implementing the various schemes for alignment and aggregation of carriers as described previously herein. These subsystems may be implemented in software or hardware which is coupled to the processing subsystem. Alternatively, in another variant, the subsystems may be directly coupled to the digital baseband.

It will be recognized that while certain embodiments of the present disclosure are described in terms of a specific sequence of steps of a method, these descriptions are only illustrative of the broader principles described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features applied to various implementations, it will be understood that various omissions, substitutions, and changes in the form and details of the device or process illustrated may be made by those skilled in the art without departing from the principles described herein. The foregoing description is of the best mode presently contemplated of carrying out the principles described herein. This description is in no way meant to be limiting, but rather should be taken as illustrative of the general principles. The scope of the present disclosure should be determined with reference to the claims.

What is claimed is:

1. A method for providing efficient spectral usage in extensible carrier deployments, the method comprising:
   identifying one or more reference carriers and one or more carrier extensions or one or more carrier segments;
   aggregating the identified one or more reference carriers and the one or more carrier extensions or the one or more carrier segments into an aggregated frequency band; and
   provisioning the aggregated frequency band to at least one user equipment (UE) device,
   wherein the one or more carrier extensions or the one or more carrier segments are configured to reduce control signaling overhead by comprising one or more self-contained reference signals, and
   wherein the aggregated frequency band comprises one or more guard band resource blocks between at least one frequency band associated with the one or more reference carriers and at least one frequency band associated with the one or more carrier extensions or the one or more carrier segments such that the aggregated frequency band is backward compatible.

2. The method of claim 1, wherein identification of the one or more reference carriers and the one or more carrier extensions or the one or more carrier segments is performed at least in part by a plurality of network base stations in a peer-to-peer manner.

3. The method of claim 1, wherein identification of the one or more reference carriers and the one or more carrier extensions or the one or more carrier segments is performed at least in part by a centralized network authority that is configured to communicate with one or more network base stations.

4. The method of claim 1, wherein:
the one or more reference carriers comprise at least one fully configured backward compatible reference carrier; and
the one or more carrier extensions or the one or more carrier segments are not backward compatible and are carrier resource additions of the one or more reference carriers.

5. The method of claim 1, wherein the one or more carrier extensions or the one or more carrier segments are configured without cell-specific reference signals.

6. The method of claim 1, wherein the one or more self-contained reference signals comprise one or more demodulation reference signals or one or more channel state information reference signals.

7. The method of claim 1, wherein the one or more self-contained reference signals comprise one or more UE device-specific reference signals that allow the at least one UE device to perform channel state estimation and/or coherent detection of at least one control channel or at least one data channel.

8. The method of claim 1, wherein the one or more self-contained reference signals comprise one or more channel state information reference signals that the UE device uses to perform mobility measurements or carrier activation/deactivation measurements.

9. The method of claim 8, wherein the carrier activation/deactivation measurements correspond to channel state information and/or path loss measurements that are evaluated to trigger activation or deactivation of at least one of the one or more carrier extensions or the one or more carrier segments.

10. The method of claim 1, wherein the aggregated frequency band comprises one or more carrier guard bands and one or more carrier segments that are appended to the identified one or more reference carriers in compliance with a legacy operating bandwidth of the at least one UE device.

11. A mobile apparatus configurable to operate using extensible carrier deployments, the mobile apparatus comprising:
at least one transceiver;
one or more processors in communication with to the at least one transceiver; and
a storage device storing computer-executable instructions that, when executed by the one or more processors, cause the mobile apparatus to:
receive one or more reference carriers, one or more carrier extensions or one or more carrier segments, and one or more guard band resource blocks in an aggregated communication spanning an aggregated frequency band;
determine whether the one or more reference carriers are contiguous or non-contiguous with the one or more carrier extensions or the one or more carrier segments in the frequency domain across the aggregated frequency band; and
select one or more reception modes for the mobile apparatus based at least in part on the determination,
wherein the one or more carrier extensions or the one or more carrier segments are configured to reduce control signaling overhead by comprising one or more self-contained reference signals, and
wherein the aggregated frequency band comprises the one or more guard band resource blocks between at least one frequency band associated with the one or more reference carriers and at least one frequency band associated with the one or more carrier extensions or the one or more carrier segments such that the aggregated frequency band is backward compatible.

12. The mobile apparatus of claim 11, wherein the one or more self-contained reference signals of the one or more carrier extensions or the one or more carrier segments comprise one or more demodulation reference signals or one or more channel state information reference signals.

13. The mobile apparatus of claim 11, wherein the one or more self-contained reference signals of the one or more carrier extensions or the one or more carrier segments comprise one or more device-specific reference signals associated with the mobile apparatus.

14. The mobile apparatus of claim 11, wherein the one or more carrier extensions or the one or more carrier segments are configured without cell-specific reference signals.

15. A base station apparatus for use in a long term evolution (LTE)-enabled wireless communications network, the base station apparatus comprising:
at least one wireless interface that is configurable to communicate with a plurality of wireless devices via the LTE-enabled wireless communications network;
one or more processors in communication with the at least one wireless interface; and
a storage device storing computer-executable instructions that, when executed by the one or more processors, cause the base station apparatus to:
identify one or more reference carriers provided by at least one other base station apparatus;
generate one or more carrier extensions or one or more carrier segments;
aggregate the identified one or more reference carriers and the one or more generated carrier extensions or the one or more carrier segments into an aggregated frequency band; and
provision the aggregated frequency band to at least one user equipment (UE) device,
wherein the one or more carrier extensions are configured to reduce control signaling overhead by comprising one or more self-contained reference signals, and
wherein the aggregated frequency band comprises one or more guard band resource blocks between at least one frequency band associated with the one or more reference carriers and at least one frequency band associated with the one or more carrier extensions or the one or more carrier segments such that the aggregated frequency band is backward compatible.

16. The base station apparatus of claim 15, wherein:
the one or more reference carriers comprise at least one fully configured backward compatible reference carrier; and
the one or more carrier extensions or the one or more carrier segments are not backward compatible and are carrier resource additions of the one or more reference carriers.

17. The base station apparatus of claim 15, wherein the one or more carrier extensions or the one or more carrier segments are configured without cell-specific reference signals.

18. The base station apparatus of claim 15, wherein the one or more self-contained reference signals comprise one or more demodulation reference signals or one or more channel state information reference signals.

19. The base station apparatus of claim 15, wherein the one or more self-contained reference signals comprise one or more UE device-specific reference signals that allow the at least one UE device to perform channel state estimation and/or coherent detection of at least one control channel or at least one data channel.

20. A wireless system for providing efficient spectral usage in extensible carrier deployments, the wireless system comprising:
- a plurality of base stations; and
- a plurality of mobile devices,
- wherein at least one base station of the plurality of base stations is configured to provide cellular network service to at least one mobile device of the plurality of mobile devices by providing one or more reference carriers to the at least one mobile device, and at least one base station of the plurality of base stations is configured to provide one or more carrier extensions or one or more carrier segments to the at least one mobile device, the one or more reference carriers and the one or more carrier extensions or the one or more carrier segments together spanning an aggregated frequency band, and
- wherein the one or more carrier extensions are configured to reduce control signaling overhead by comprising one or more self-contained reference signals, and
- wherein the aggregated frequency band comprises one or more guard band resource blocks between at least one frequency band associated with the one or more reference carriers and at least one frequency band associated with the one or more carrier extensions or the one or more carrier segments such that the aggregated frequency band is backward compatible.

21. The wireless system of claim 20, wherein the one or more carrier extensions or the one or more carrier segments and the one or more reference carriers are aggregated by one or more base stations of the plurality of base stations to form a contiguous frequency bandwidth having minimized frequency gap spacing between at least one frequency band associated with the one or more reference carriers and at least one frequency band associated with the one or more carrier extensions or the one or more carrier segments.

22. The wireless system of claim 20, wherein the one or more carrier extensions or the one or more carrier segments and the one or more reference carriers are aggregated by at least one base station of the plurality of base stations to form a non-contiguous frequency bandwidth between at least one frequency band associated with the one or more reference carriers and at least one frequency band associated with the one or more carrier extensions or the one or more carrier segments.

23. A method for operating a mobile device within a wireless system using extensible carrier deployments, the method comprising:
- receiving an aggregated communication comprising one or more reference carriers and one or more carrier extensions;
- evaluating the aggregated communication;
- based at least in part on the evaluation, determining whether the one or more reference carriers are contiguous with the one or more carrier extensions in the frequency domain; and
- processing the one or more reference carriers and the one or more carrier extensions of the aggregated communication using a single Fast Fourier Transform (FFT) element of the mobile device,
- wherein the one or more carrier extensions are configured to reduce control signaling overhead by comprising one or more self-contained reference signals, and
- wherein the one or more self-contained reference signals comprise one or more channel state information reference signals that allow the mobile device to perform mobility measurements or carrier activation/deactivation measurements that correspond to channel state information and path loss measurements that are evaluated to trigger activation or deactivation of at least one of the one or more carrier extensions.

24. The method of claim 23, wherein the one or more self-contained reference signals further comprise one or more device-specific reference signals that allow the mobile device to perform channel state estimation and/or coherent detection of at least one control channel or at least one data channel.

25. A method for providing efficient spectral usage in extensible carrier deployments, the method comprising:
- identifying one or more reference carriers and one or more carrier extensions or one or more carrier segments;
- aggregating the identified one or more reference carriers and the one or more carrier extensions or the one or more carrier segments into an aggregated frequency band; and
- provisioning the aggregated frequency band to at least one user equipment (UE) device, wherein the one or more carrier extensions or the one or more carrier segments are configured to reduce control signaling overhead by comprising one or more self-contained reference signals,
- wherein the one or more carrier extensions or the one or more carrier segments are configured with Primary Synchronization Symbols (PSS) or Secondary Synchronization Symbols (SSS), and
- wherein the PSS or the SSS indicate a time reference for the one or more carrier extensions or the one or more carrier segments when a non-contiguous frequency separation exists between the one or more reference carriers and the one or more carrier extensions or the one or more carrier segments.

26. The method of claim 25, wherein the one or more carrier extensions or the one or more carrier segments are configured without cell-specific reference signals.

27. A method for providing efficient spectral usage in extensible carrier deployments, the method comprising:
- identifying one or more reference carriers and one or more carrier extensions or one or more carrier segments;
- aggregating the identified one or more reference carriers and the one or more carrier extensions or the one or more carrier segments into an aggregated frequency band; and
- provisioning the aggregated frequency band to at least one user equipment (UE) device, wherein the one or more carrier extensions or the one or more carrier segments are configured to reduce control signaling overhead by comprising one or more self-contained reference signals,
- wherein the one or more self-contained reference signals comprise one or more channel state information reference signals that the UE device uses to perform mobility measurements or carrier activation/deactivation measurements, and
- wherein the carrier activation/deactivation measurements correspond to channel state information and/or path loss measurements that are evaluated to trigger activation or deactivation of at least one of the one or more carrier extensions or the one or more carrier segments.

28. The method of claim 27, wherein the one or more carrier extensions or the one or more carrier segments are configured without cell-specific reference signals.

* * * * *